United States Patent [19]

Hughes et al.

[11] Patent Number: 4,737,627

[45] Date of Patent: Apr. 12, 1988

[54] METHOD OF DETECTING THE IMPROPER SEPARATION OF DOCUMENTS BEING FED THROUGH A DOCUMENT COUNTER OR THE LIKE

[75] Inventors: Arthur D. Hughes, Gladwyne; Kenneth C. Makoid, Bridgeport, both of Pa.

[73] Assignee: Technitrol, Inc., Philadelphia, Pa.

[21] Appl. No.: 810,684

[22] Filed: Dec. 19, 1985

[51] Int. Cl.[4] .............................................. G01N 9/24
[52] U.S. Cl. .................................. 250/223 R; 356/434
[58] Field of Search .................. 250/223 R, 559, 562, 250/563, 571, 572; 356/434, 442–443

[56] References Cited

U.S. PATENT DOCUMENTS

| | | | |
|---|---|---|---|
| 4,237,378 | 12/1980 | Jones | 250/223 R |
| 4,380,396 | 4/1983 | Arndt et al. | 356/434 |
| 4,642,456 | 2/1987 | Watanabe | 250/223 R |
| 4,650,991 | 3/1987 | Croset et al. | 250/223 R |
| 4,652,742 | 3/1987 | Wauer et al. | 250/223 R |

Primary Examiner—Edward P. Westin
Assistant Examiner—Charles F. Wieland
Attorney, Agent, or Firm—Frank A. Follmer

[57] ABSTRACT

A method of detecting the feeding of doubles in a high speed document counter is disclosed. Also, a method of detecting the feeding of a chain of documents as a batch of documents are fed through a feed path is disclosed.

7 Claims, 4 Drawing Sheets

METHOD OF DETECTING THE IMPROPER SEPARATION OF DOCUMENTS BEING FED THROUGH A DOCUMENT COUNTER OR THE LIKE

BACKGROUND OF THE INVENTION

The high speed document counters in use today use several methods of detecting the improper condition of more than one document passing through the feed path at one time, such a feed being called a "double". One of these prior art means involves using a light emitting diode (LED) placed on one side of the document feed path and focused on a light detector on the other side of the document feed path. The amount of light from the LED is kept constant. As a document passes between the LED and the light detector, the amount of light passing through the document is determined by the light detector in terms of current or voltage in the light detector circuit.

One problem with the above-described doubles detection method is that there is non-linearity of the output of the light detector as a function of the amount of light striking the detector over a wide range of brightness. The wide range of brightness is encountered because there is full brightness with no document in the line of detection and there is little brightness when a document such as a U.S. dollar bill is in the line of detection because of the opaqueness of the U.S. dollar bills. Furthermore, there is little difference in the brightness detected between a single U.S. dollar bill and a double U.S. dollar bill as compared to no documents versus a single document present. Therefore, the circuit required to compensate for this nonlinearity must be complex.

Another problem with the above-described prior art doubles detection method is that there is a variation in the construction of the light detectors so that the light detection circuit has to be designed to take this variation into account and a complex setup method must be provided so that all document counters operate the same.

In addition to doubles detection, high speed document counters must also provide a means for detecting if two or more successive documents pass through the counter feed path with no gap between them, this being referred to in the art as a "chain". In order to be able to detect a chain, the counter must be able to "measure" the width of the document after it detects the leading edge so as to determine that the trailing edge comes within an expected range.

The problem faced with chain detection is that the time that a document passes through the counter is variable and depends on where it falls within a batch. The first document in the batch is critical because it is more likely to produce a chain and so must be checked most precisely. The middle documents must be measured with average precision and the last document of the batch is slower than the other documents because the drive motor decellerates as this last document is fed through the counter.

These variations in precision and time are circumvented in the prior art machines by the use of a timing wheel. A timing wheel is a disc with evenly spaced holes around the outer part of the wheel. The wheel is placed on one of the main shafts of the document counter so that its rotational speed is approximately in proportion to the rate at which documents pass through the counter. A sensor-LED combination "sees" the holes in the timing wheel and produces timing pulses. Using these timing pulses, instead of real time, allows the counter to measure each document with enough precision to determine whether a chain of documents passes through the counter. However, the use of a timing wheel is expensive and increases the cost of the counter substantially.

SUMMARY OF THE INVENTION

One object of the invention is to provide a doubles detection method which uses a LED and light detector with a greatly simplified circuit and setup method. Briefly stated, the method in accordance with the invention does not have an LED which produces a constant brightness, but rather employs a variable resistance in a plurality of discrete steps to set the LED brightness control. The light detector on the other side of the document path is arranged to provide an output to a manually variable setup resistor. Once this resistor is set during manufacture and testing, the resistor setting stays the same. Also, the output voltage from the detector feeds a comparator input which has a second input which is fed by a constant reference voltage. The method is such that when the light detector output is greater than the reference voltage, then there is an output from the comparator to a document opacity measurement control. When the light detector output is less than the reference voltage, the comparator output is false or zero, i.e., there is no output.

In accordance with the method of the invention, by successive changes in the LED brightness it is determined which discrete brightness emission produces an output voltage from the light sensor to one input of the voltage comparator that most closely approximates the constant opposing voltage input thereto.

Another object of the invention is to provide a simple and effective method of detecting a chain of documents without the use of a timing wheel. To this end, the method of the invention involves the use of real time as the basis for measuring the width of each document combined with setting up different chain thresholds depending on whether a document is the first, middle, or last document of a batch of documents being fed through the counter. Measurements on a plurality of operating machines are used to determine average times for first, middle and last documents of a batch to pass between the LED and light detector in the document counter. Based on these measurements, thresholds are set for each document position, i.e., first, middle or last. If there is a feed of a chain of documents, one of these thresholds will be exceeded and the counter will be operated to take proper action, such as stopping operation and signaling the chain.

The essential feature of the method for chain detection in accordance with the invention is the control of the three different time thresholds. This control keeps track of the document feeding operation taking place. It applies the three thresholds as time measurements so that if a document passes under the sensor for a time equivalent to or greater than a predetermined document width, it is a "chain".

DETAILED DESCRIPTION OF THE PREFERRED EMBODIMENT

Figure 1:
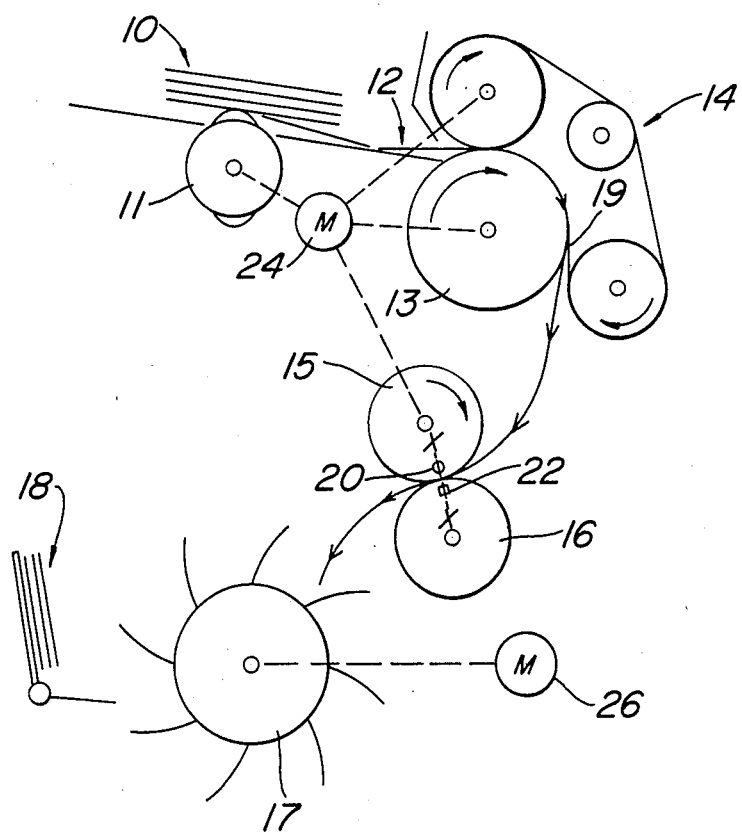
FIG. 1 is a diagrammatic showing of the feed path of a document through a document counter.

FIG. 1 is a diagrammatic showing of the feed path of a document through a document counter as the document moves from a supply hopper to an output stacker. As shown in this figure the apparatus for feeding the document comprises a supply hopper 10, a picker 11, an input hopper 12, a feed roller 13, a stripper mechanism 14, an acceleration roller 15 and its associated idler roller 16, a stacker wheel 17 and an output stacker 18. The direction of movement of the parts is shown by the arrows in FIG. 1. The document feeding arrangement shown in FIG. 1 is conventional and is similar to that described in U.S. Pat. No. 4,216,952.

In the use of the apparatus shown in FIG. 1 a stack of documents placed in the supply hopper 10 has the lowermost documents thereof fed sequentially by the picker 11 into the input hopper 12 from which the documents come into contact with the high friction surface of the feed roller 13. The feed roller 13 feeds the documents into contact with the lower friction belt 19 of stripper mechanism 14 which supplies the normal force to hold the document in frictional engagement with the high friction surface of the feed roller 13 over the arcuate feed path where belt 19 and feed roller 13 overlie each other. The counter-rotating movement of the stripper belt 19 will not be effective to prevent movement of the endmost document of the stack through the stripper mechanism 14, but the next document behind the endmost document is easily held back by the movement of the stripper belt 19 until the endmost document is fed through said arcuate feed path and the subsequent document can contact the high friction surface of the feed roller 13. When a document passes through the arcuate area where the feed roller and the stripper belt 19 overlie each other, it is directed by suitable guide plates into the pinch of the acceleration roller 15 and its associated idler roller 16. The acceleration roller rotates at a high speed so as to sequentially space the documents apart from one another once they have been separated by the stripper mechanism 14. Such separation facilitates counting and also enables the location of the leading edge of each document. Each document passes successively into the pinch of the acceleration roller 15 and the idler roller 16 where the high friction of the acceleration roller 15 effectively pulls it away from the feeder stripper mechanism. Thus, for a time, the preceding document is moving faster than the following document in order to allow a space between sequential documents to facilitate the detecting and counting of the individual documents.

There is provided a document sensing means which includes a light emitting diode (LED) 20 and a light sensor 22 which senses each document as it passes a reference point in the document feed path. In a document counter, the light sensor 22 senses the leading edge of each document as it passes the reference point and sends a signal to a document counting control which records the signal and keeps a count of the documents being fed. As shown in FIG. 1, the sensing position is preferably at the pinch of the acceleration roller 15 and its associated idler roller 16 (see line X—X).

Figure 2:
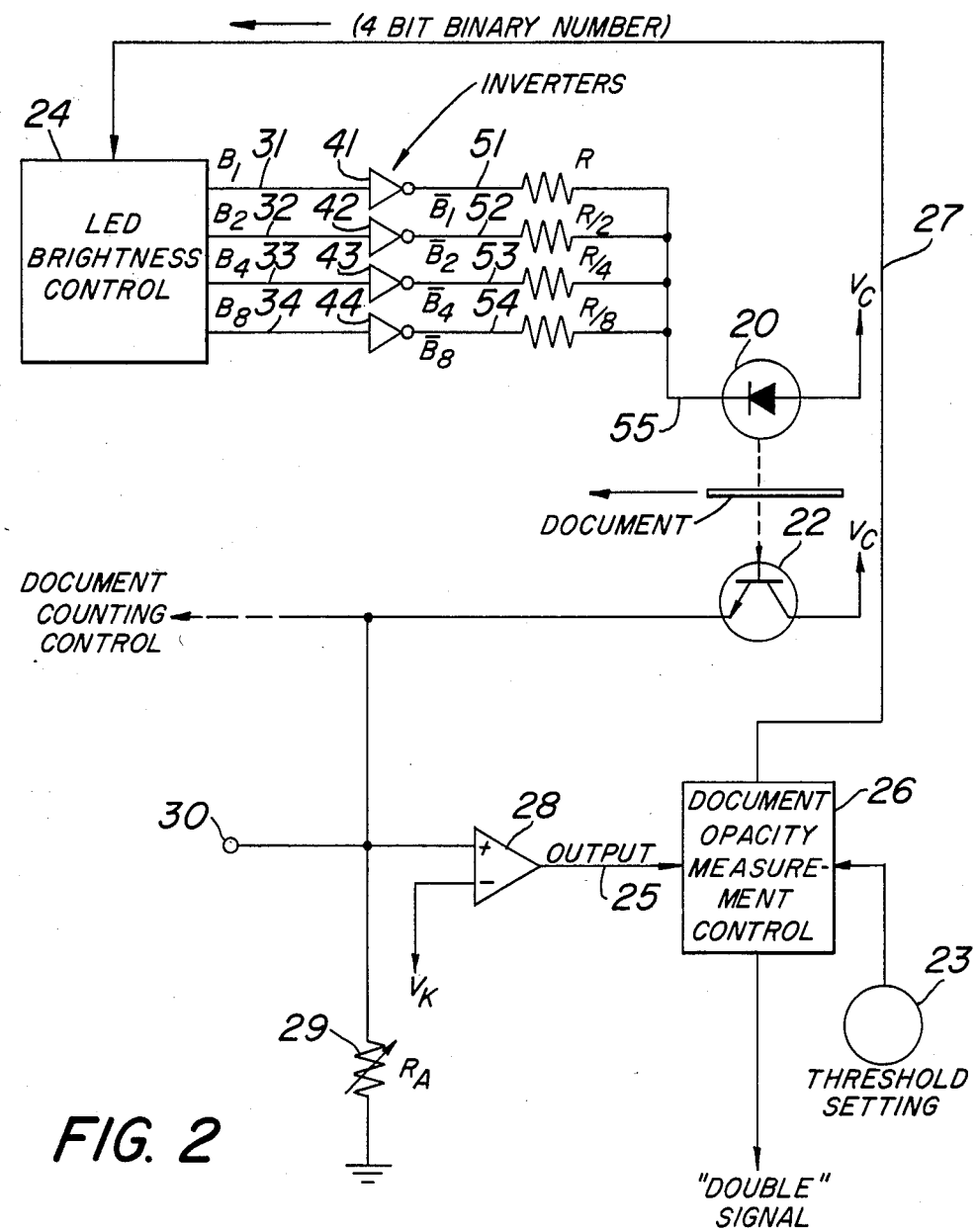
FIG. 2 depicts the opacity measurement circuit for the doubles detection method in accordance with the invention.

In FIG. 2 there is shown the opacity measurement circuit for the doubles detection method in accordance with the invention. The main elements of this circuit, in addition to the light emitting diode 20 and the light sensor 22, comprise a LED Brightness Control 24, a Document Opacity Measurement Control 26 and a comparator 28. Comparator 28 has a $V_K$ volt comparator threshold as shown in FIG. 2. The circuit also includes a $R_A$ ohm manually variable set-up resistor 29 and a test voltage terminal point 30 connected to the output of light sensor 22 as shown in FIG. 2.

The LED Brightness Control 24 consists of a four-bit storage register and steering logic to accept a four-bit binary number transmitted thereto through a line 27 from the Document Opacity Measurement Control 26. The output of the storage register of the LED Brightness Control 24 consists of four lines 31, 32, 33, and 34 each holding one bit of the four-bit binary number represented by $B_1$, $B_2$, $B_4$, and $B_8$ as shown in FIG. 2. A zero volts level on one of the output lines 31–34 from the storage register is defined as a binary "0", and a $V_C$ volts level on one of these output lines 31–34 is defined by a binary "1" for a purpose to be described more fully hereafter. Each of the output lines 31–34 from the storage register of the LED Brightness Control 24 feeds one of the inverters 41–44, respectively, which function so that the output of the inverters 41–44 is the opposite of the output from the LED Brightness Control. Thus, the output lines 51–54 of the inverters 41–44, respectively, provide signals indicated by $\overline{B_1}$, $\overline{B_2}$, $\overline{B_4}$, and $\overline{B_8}$ as shown in FIG. 2. The output lines 51–54 of the inverters 41–44 feed resistors of different resistances. The output line 51 from the inverter 41 containing the signal $\overline{B_1}$ is fed through a resistor of value R to the LED 20. The output line 52 from the inverter 42 containing the signal $\overline{B_2}$ is fed through a resistor of value R/2 to the LED 20. The output line 53 from the inverter 43 containing the signal $\overline{B_3}$ is fed through a resistor of value R/4 to the LED 20. The output line 54 of the inverter 44 containing the signal $\overline{B_8}$ is fed through a resistor of value R/8 to the LED 20.

The LED 20 has one side thereof connected to the effective parallel resistor circuit through a line 55 and the other side thereof has $V_C$ volts supplied thereto. The circuitry is such that when any bit is OFF or "0", then no current flows through its associated resistor because the resistor is (by reason of the signal from its associated inverter 41–44) pulled up to nominally $V_C$ volts on one side and, via the LED 20, also nominally $V_C$ volts on the other side. However, when a bit is ON or "1", then current flows through its associated resistor because the resistor is ground or zero volts on one side and nominally $V_C$ volts on the other. Typically, there is a voltage drop $V_L$ across the LED 20, whereby the resistor has $V_C-V_L$ volts across it when the corresponding bit is ON or "1".

Since there are sixteen combinations for the four bits being either OFF or ON, the total current through the LED 20 can be controlled by which of the sixteen numbers is sent to the LED Brightness Control 24 through line 27 from the Document Opacity Measurement Control 26. The resulting current for each of the sixteen numbers is illustrated by Table 1, hereafter, which shows that this current varies from 0 to 15 $(V_C-V_L)/R$, given in milliamperes (ma.).

Further, the linearity of the current through the LED 20 as the LED Brightness Control 24 is varied through the sixteen numbers is shown by Table 1.

TABLE 1

TABLE OF CURRENT VALUES THROUGH LED

| DECIMAL VALUE | $B_8$ | $B_4$ | $B_2$ | $B_1$ | RESISTORS WITH CURRENT FLOW | EQUIVALENT RESISTANCE (OHMS) | CURRENT FOR $(V_C\text{-}V_L)$ VOLTS (ma) |
|---|---|---|---|---|---|---|---|
| 0 | 0 | 0 | 0 | 0 | None | Infinite | 0 |
| 1 | 0 | 0 | 0 | 1 | R | R | $(V_C\text{-}V_L)/R$ |
| 2 | 0 | 0 | 1 | 0 | R/2 | R/2 | $2(V_C\text{-}V_L)/R$ |
| 3 | 0 | 0 | 1 | 1 | R/2, R | R/3 | $3(V_C\text{-}V_L)/R$ |
| 4 | 0 | 1 | 0 | 0 | R/4 | R/4 | $4(V_C\text{-}V_L)/R$ |
| 5 | 0 | 1 | 0 | 1 | R/4, R | R/5 | $5(V_C\text{-}V_L)/R$ |
| 6 | 0 | 1 | 1 | 0 | R/4, R/2 | R/6 | $6(V_C\text{-}V_L)/R$ |
| 7 | 0 | 1 | 1 | 1 | R/4, R/2, R | R/7 | $7(V_C\text{-}V_L)/R$ |
| 8 | 1 | 0 | 0 | 0 | R/8 | R/8 | $8(V_C\text{-}V_L)/R$ |
| 9 | 1 | 0 | 0 | 1 | R/8, R | R/9 | $9(V_C\text{-}V_L)/R$ |
| 10 | 1 | 0 | 1 | 0 | R/8, R/2 | R/10 | $10(V_C\text{-}V_L)/R$ |
| 11 | 1 | 0 | 1 | 1 | R/8, R/2, R | R/11 | $11(V_C\text{-}V_L)/R$ |
| 12 | 1 | 1 | 0 | 0 | R/8, R/4 | R/12 | $12(V_C\text{-}V_L)/R$ |
| 13 | 1 | 1 | 0 | 1 | R/8, R/4, R | R/13 | $13(V_C\text{-}V_L)/R$ |
| 14 | 1 | 1 | 1 | 0 | R/8, R/4, R/2 | R/14 | $14(V_C\text{-}V_L)/R$ |
| 15 | 1 | 1 | 1 | 1 | R/8, R/4, R/2, R | R/15 | $15(V_C\text{-}V_L)/R$ |

Referring to FIG. 2, it will be apparent that as a document passes between the LED 20 and the light sensor 22, the light is attenuated by the document. Moreover, the greater the opacity of the document, the greater will be the attenuation of the light that reaches the light sensor 22. A double document will, of course, attenuate the light much more than a single document.

The opacity measurement circuit is set up by statically placing a standard document between the LED 20 and sensor 22. This standard has been measured on a reference unit which has been set up by trial and error to properly operate with actual documents. The circuit components and the $V_K$ volt comparator threshold are chosen such that a wide range of opacity documents can be used with the counter once the set-up resistor is adjusted to match the voltage established on the reference unit. With the standard document in place, the resistance value $R_A$ of set-up resistor 29 is adjusted such that the voltage measured at the test voltage point 30 is the same as that for the standard unit. Once this set-up is completed, the opacity measurement circuit shown in FIG. 2 is ready for use.

Dynamically, as each document passes between the LED 20 and light sensor 22, there is time to take two sets of eight measurements, or a total of sixteen measurements, across a 2.5 inch wide document. Each set of eight measurements is summed, which is the equivalent of averaging. The sum is then compared with a fixed threshold for the type of document being used. If the total exceeds the threshold, the document is flagged as a "double" indicating that two (or more) documents passed through together. The operator of the document counter can control the setting of the threshold depending on the type of documents being run through the document counter by setting the threshold setting control 23 which is arranged to send a signal to set the Opacity Measurement Control 26. By way of example, a low setting is used for food stamps and other low opacity documents, a medium setting is used for new U.S. currency and certain foreign currencies, and a high setting is used for old U.S. currency and certain high opacity foreign currencies.

The procedure for a single measurement out of the sixteen measurements made per document will now be described with particular reference to FIG. 3 which shows the algorithm for a single doubles measurement. By way of example, each single measurement takes less than 0.4 milliseconds.

Each measurement is made in four steps, which are controlled by the Document Opacity Measurement Control 26. Each step is accomplished by setting up a binary number for the LED Brightness Control 24. Each measurement sequence starts by setting up the binary number with decimal equivalent number 8. By reason of circuitry described above, the LED 20 will have an equivalent current $8(V_C\text{-}V_L)R$ ma. passing through it. Thus, the number 8 results in a brightness in the mid-range. Likewise, the number 0 produces no light, the number 1 produces the dimmest light output, and the light varies up to the number 15 which produces the brightest light output. The discrete brightness variations are essentially linear as can be seen from Table 1.

As the light from the LED 20 passes through the moving document onto the light sensor 22, the current output produced by the sensor 22 is reasonably close to being linear with respect to the amount of light and hence the voltage on the plus input through the comparator 28 is reasonably close to being linear with respect to the amount of light. If this amount of voltage is at or above $V_K$ volts (the comparator threshold), the comparator 28 will give an output (true) signal through line 25 to the Document Opacity Measurement Control 26. On the other hand, if this amount of voltage is below $V_K$ volts, the comparator 28 will give an output (false) signal through line 25 to the Document Opacity Measurement Control 26. The objective of the circuitry is to find that amount of light which just trips the comparator 28 at $V_K$ volts. This is achieved in the four steps illustrated in FIG. 3.

Figure 3:
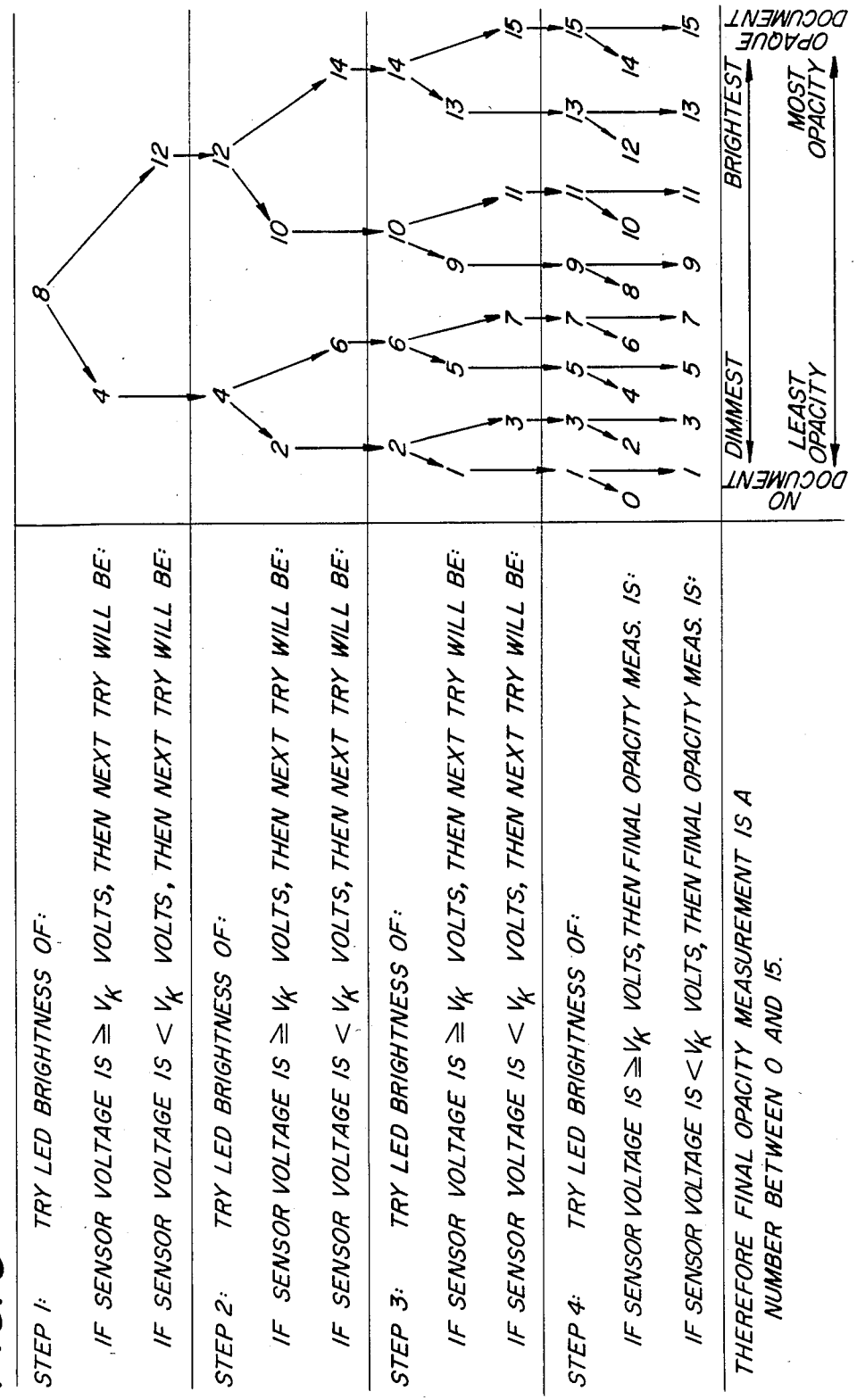
FIG. 3 is a table showing the algorithm for a single doubles measurement by the circuit shown in FIG. 2.

As illustrated in FIG. 3, the final measurement of opacity is given as a number between zero and fifteen. As a specific illustration as to how the opacity measurement is arrived at in the four steps, let it be assumed that the opacity measurement of 5 most closely corresponds to the opacity of the document. In this case the sequence of steps are as follows: In Step 1 an LED brightness setting of 8 is tried; in Step 2 an LED brightness setting of 4 is tried; in Step 3 an LED brightness setting of 6 is tried; and in Step 4 an LED brightness setting of 5 is tried to produce a sensor voltage of less than $V_K$ volts giving a final opacity measurement of 5. As another example, the sequence of the four steps for a opacity measurement resulting in number 12 would be as follows: In Step 1 an LED brightness of 8 is tried; in Step 2 an LED brightness of 12 is tried; in Step 3 an LED brightness of 14 is tried; and in Step 4 an LED brightness of 13 is tried with the sensor voltage being equal to or greater than $V_K$ volts to give a final opacity measurement of 12.

In the preferred method of the invention, this measurement is repeated eight times as the document moves between the LED 20 and the light sensor 22 and the opacity measurement is summed resulting in a number between 0 and 120. Then, as the document moves further, the process is repeated to produce another number between 0 and 120. The result is that the two separate sets or readings for possible doubles are made for each document. Each of these two sets of readings is compared with a threshold, and if either, or both, readings exceeds the threshold then the document is called a "double" because its opacity is too high. The threshold may be set according to the types of documents being run. Typical examples used with various types of products are a high threshold setting of 89 for old, worn U.S. currency, a medium threshold setting of 52 for new U.S. currency, and a low threshold setting of 28 for U.S. food coupons.

Briefly stated, it will be apparent that the method of detecting a double document feed in accordance with the invention involves the steps of (1) controlling the light emitting diode 20 to emit successive discrete brightness emissions of varying brightness, these brightness emissions being directed across the document feed path at the reference point; (2) sensing each of the brightness emissionsby LED 20 and providing an electrical output whose voltage corresponds to the brightness sensed; (3) directing this output voltage to one input (positive) of the voltage comparator 28, a constant voltage being directed to a second input (negative) of the voltage comparator 28 in opposition to the first input, whereby the voltage comparator 28 provides an output signal indicating whether or not the voltage supplied to said one input thereof is greater than said constant voltage applied to said second input thereof; and (5) determining which of the above-described discrete brightness emissions produces a sensor output voltage to said one input of the voltage comparator that most closely approximates said constant opposing voltage input thereto to thereby provide a measure of the opacity of that part document being fed past said reference point at the time of measurement.

Figure 4:
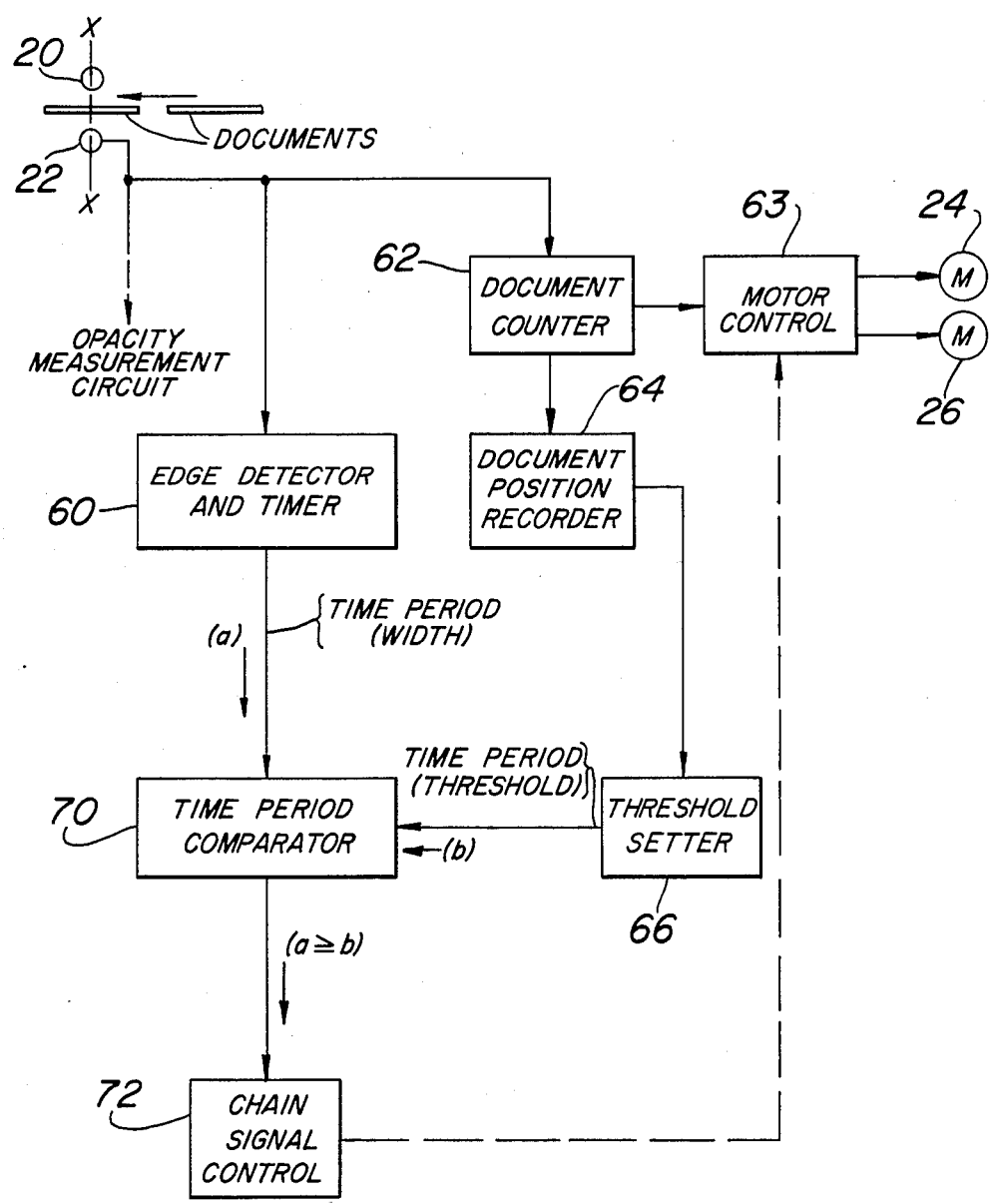
FIG. 4 is a diagrammatic showing of the elements used in the chain detection method in accordance with the invention.

FIG. 4 is a diagrammatic showing of the elements used in the chain detecting method in accordance with the invention. Briefly stated, the method of the invention for detecting the feeding of a chain of documents as a batch of documents are fed through a feedpath comprises the steps of (1) detecting the leading and trailing edges of each document as it passes a reference point in the document feed path to determine a time period indicative of the width of the document; (2) determining whether each document passing the reference point is either the first document in the batch, the last document in the path, or a middle document in between said first and last documents; (3) setting different threshold time periods for each of said first, middle and last documents; (4) comparing the detected time period indicative of the width of the document with one of the three threshold time periods set, the first document width being compared to the threshold period set for the first document, the last document width being compared to the threshold period for the last document, and the middle document width being compared to the threshold period for the middle documents; and (5) providing a signal of a document chain if any of said document width time periods are equal to or greater than the threshold time period to which it is compared.

A batch of documents are fed through a feed path by motors 24 and 26 as shown in FIG. 1 and described above. The means for achieving the chain detection method of the invention are shown in FIG. 4 and comprise the light emitting diode 20 and the light sensor 22 which are located in the document feed path in the manner described above with respect to the doubles detection method of the invention. As shown in FIG. 4, in addition to being connected to the opacity measurement circuit, the output from the light sensor 22 is directed to an Edge Detector and Timer 60 and a Document Counter 62. The Edge Detector and Timer 60 receives signals from sensor 22 to detect the leading and trailing edges of each document as it passes a reference point (i.e., location X—X in FIG. 1) in the document feed path to determine a time period (a) indicative of the width of the document. As is conventional, the counter 62 sends a signal to the Motor Control 63 for motors 24 and 26 for use in starting and stopping the same in the batching of the documents. This as described in detail in copending application Serial No. 800305. Counter 62 also sends a signal to a Document Position Recorder 64 which determines whether each document passing the reference point is either the first document in the batch, a middle document in the batch, or the last document in the batch. The Document Position Recorder 64 sends signals to a Threshold Setter 66 which sets different threshold time periods (b) for each of the first, middle and last documents in the batch.

As shown in FIG. 4, the Edge Detector and Timer 60 sends a signal (a) to a Time Period Comparator 70, which signal (a) is equivalent to the detected time period indicative of the width of the document and, concurrently, the Threshold Setter 66 sends signal (b) to the Time Period Comparator 70, which signal (b) is equivalent to the corresponding threshold time period for the type (i.e., first, middle or last) of document fed past the reference point. In other words, the above-described means operate so that the first document width is compared to the threshold period set for the first document, the middle document width is compared to the threshold period set for a middle document, and the last document width is compared to the threshold period set for the last document.

As shown in FIG. 4, the Time Period Comparator 70 provides a signal of a document chain to a Chain Signal Control 72 if any of the document width time periods (a) signaled from Edge Detector and Timer 60 are equal to or greater than the threshold time period (b) to which said width time period is compared. When this signal is sent to the chain Signal Control 72, the document counter will take proper action such as signaling a chain and stopping the feed of the document counter by a control signal to the Motor Control 63.

The key to the method of chain detection in accordance with the invention is the control of the three different thresholds. By keeping track of the operation taking place, three thresholds are applied as time measurements to the Time Period Comparator 70 so that if a document passes the sensor reference point for a time equivalent to or greater than the predetermined threshold time, it is a chain and a chain signal is given. By way of illustration, the relationship for the three thresholds in time for a document counter for use in feeding U.S. currency are about 50-80 units of time for the first and middle document, and about 250 units of time for the last document.

In accordance with an actual embodiment of the invention the various elements of the chain detection means shown in FIG. 4 are all incorporated in the microprocessor for the document counter in accordance with conventional techniques. It will be apparent that other means may be employed to carry out the invention if desired.

What is claimed is:

1. A method of detecting if a double document feed occurs past a reference point as documetns, such as paper currency or the like, are being fed successively past the reference point at a high speed comprising the steps of:
   (1) making a plurality of measurements of the opacity of a plurality of parts of each document as it is fed past said reference point, each of said opacity measurements including the steps of
      (a) controlling a light emitting diode to emit successive discrete brightness emissions of varying brightness, said brightness emissions being directed across the document feed path at said reference point,
      (b) sensing each of said brightness emissions and providing an electrical output whose voltage corresponds to the brightness sensed,
      (c) directing said voltage output to one input of a voltage comparator,
      (d) directing a constant voltage to a second input of the voltage comparator in opposition to said one input, said voltage comparator providing an output signal indicating whether or not said voltage supplied to said one input thereof is greater than said constant voltage applied to said second input thereof, and
      (e) determining which of said successive discrete brightness emissions of varying brightness produces a voltage output from the sensor to said one input of said voltage comparator that most closely approximates said constant opposing voltage input thereto to provide a measure of the opacity of that part of the document being fed past said reference point,
   (2) integrating said plurality of opacity measurements, and
   (3) comparing the integrated value to a threshold value to determine if there is a double document feed past the reference point.

2. A method according to claim 1 wherein said brightness emissions of the light emitting diode are controlled by automatically varying the resistance of the voltage supplied to the light emitting diode in discrete steps, said resistance being varied in different sequences depending on whether or not the sensor voltage output is greater or less than said constant opposing voltage input to said comparator.

3. A method according to claim 2 wherein said step of controlling the light emitting diode to emit successive brightness emissions of varying brightness includes the use of a computer controlled resistor matrix using four resistors in a binary selection sequence.

4. A method according to claim 1 wherein said documents comprise sheets of paper currency having a substanital variance of opacity along the surface thereof.

5. A method according to claim 1, wherein said integration of the plurality of opacity measurements comprises the totaling of the opacity measurements and a comparison of the total value with a threshold value to determine if there is a double document feed past the reference point.

6. A method according to claim 1 wherein said opacity measurements of the document are made in two sets of measurements over spaced apart portions of the document along the length thereof.

7. A method according to claim 6 wherein each of said two sets of opacity measurements includes eight measurements, whereby there is a total of sixteen opacity measurements.

* * * * *